(12) United States Patent  
Chen et al.

(10) Patent No.: US 9,223,513 B2
(45) Date of Patent: Dec. 29, 2015

(54) ACCESSING DATA IN A DUAL VOLUME DATA STORAGE SYSTEM USING VIRTUAL IDENTIFIERS

(71) Applicant: International Business Machines, Armonk, NY (US)

(72) Inventors: Ye Chen, Shanghai (CN); Ruo Meng Hao, Shanghai (CN); Shu Xi Wei, Shanghai (CN)

(73) Assignee: International Business Machines Corporation, Armonk, NY (US)

(*) Notice: Subject to any disclaimer, the term of this patent is extended or adjusted under 35 U.S.C. 154(b) by 146 days.

(21) Appl. No.: 13/972,531

(22) Filed: Aug. 21, 2013

(65) Prior Publication Data
US 2014/0068215 A1  Mar. 6, 2014

(30) Foreign Application Priority Data

Aug. 29, 2012  (CN) .......................... 2012 1 0313056

(51) Int. Cl.
*G06F 3/00* (2006.01)
*G06F 13/12* (2006.01)
*G06F 3/06* (2006.01)
*G06F 11/20* (2006.01)
*G06F 11/16* (2006.01)

(52) U.S. Cl.
CPC .............. *G06F 3/065* (2013.01); *G06F 3/0614* (2013.01); *G06F 3/0683* (2013.01); *G06F 11/2094* (2013.01); *G06F 11/1662* (2013.01); *G06F 2201/82* (2013.01)

(58) Field of Classification Search
None
See application file for complete search history.

(56) References Cited

U.S. PATENT DOCUMENTS

| 7,251,745 | B2 | 7/2007 | Koch et al. |
| 7,836,332 | B2 | 11/2010 | Hara et al. |
| 8,037,344 | B2 | 10/2011 | Hara et al. |
| 2004/0098637 | A1* | 5/2004 | Duncan et al. ................. 714/6 |
| 2006/0031594 | A1* | 2/2006 | Kodama ......................... 710/5 |
| 2008/0114961 | A1 | 5/2008 | Ramaswamy et al. |
| 2009/0025007 | A1 | 1/2009 | Hara et al. |
| 2011/0029973 | A1 | 2/2011 | Hara et al. |
| 2012/0278280 | A1* | 11/2012 | Broido et al. ................ 707/610 |

FOREIGN PATENT DOCUMENTS

| EP | 2017711 A2 | 1/2009 |
| JP | 200926295 A | 2/2009 |

* cited by examiner

Primary Examiner — Idriss N Alrobaye
Assistant Examiner — David Martinez
(74) Attorney, Agent, or Firm — Yee & Associates, P.C.; Joseph Patrokaitis

(57) ABSTRACT

A data storage system, and a method for accessing data in a data storage system, wherein the data storage system comprises at least a first volume and a second volume, and the first volume and the second volume remain consistent by a synchronous copy relationship, the method comprising: setting a virtual unique identifier of the second volume as a unique identifier of the first volume; creating a first path from a host to the first volume and a second path from the host to the second volume by using the unique identifier of the first volume; accessing data by using the first path from the host to the first volume; and setting the second path from the host to the second volume as unavailable.

7 Claims, 3 Drawing Sheets

ACCESSING DATA IN A DUAL VOLUME DATA STORAGE SYSTEM USING VIRTUAL IDENTIFIERS

CROSS-REFERENCE TO RELATED APPLICATION(S)

This Application claims the benefit of priority to Chinese Patent Application Serial No. 201210313056.3, filed on Aug. 29, 2012, the contents of which are hereby incorporated by reference.

FIELD OF THE INVENTION

The present invention relates to a data storage system, and more particularly, to a method and apparatus for accessing data in a data storage system.

BACKGROUND OF THE INVENTION

Cloud storage is a system developed based on cloud computing that gathers numerous different types of storage devices in networks by application software to collaborate and collectively provide data storage and business access functions to the outside, through functionalities of cluster application, grid technology or distributed file system, etc. When operations and processing of a cloud computing system focus on storage and management of massive data, the cloud computing system needs to be configured with a lot of storage devices, and the cloud computing system becomes a cloud storage system. Therefore, the cloud storage is a cloud computing system focusing on data storage and management. To guarantee that a reliable cloud storage service can be provided to users, the provider of the cloud storage service generally backs up data of a production-end storage system by means of synchronous copying. When the production-end storage system has a failure or disaster, the backup-end storage system may be enabled to substitute for the production-end storage system so as to continue to provide data access to the host. The service provider is required to provide continuous data access services to users in a cloud storage environment.

SUMMARY OF THE INVENTION

Illustrative embodiments of the present invention provide a method and apparatus for accessing data in a data storage system.

According to an aspect of the present invention, a method for accessing data in a data storage system is provided, wherein the data storage system comprises at least a first volume and a second volume, and the first volume and the second volume remain consistent by a synchronous copy relationship, the method comprising: setting a virtual unique identifier of the second volume as a unique identifier of the first volume; creating a first path from a host to the first volume and a second path from the host to the second volume by using the unique identifier of the first volume; accessing data by using the first path from the host to the first volume; and setting the second path from the host to the second volume as unavailable.

According to another aspect of the present invention, an apparatus for accessing data in a data storage system is provided, wherein the data storage system comprises at least a first volume and a second volume, and the first volume and second volume remain consistent by a synchronous copy relationship, the apparatus comprising: identifier setting means configured to set a virtual unique identifier of the second volume as a unique identifier of the first volume; path creating means configured to create a first path from the host to the first volume and a second path from the host to the second volume by using the unique identifier of the first volume; data accessing means configured to access data by using the first path from the host to the first volume; and path setting means configured to set the second path from the host to the second volume as unavailable.

BRIEF DESCRIPTION OF THE ACCOMPANYING DRAWINGS

The above and other objectives, features and advantages of the present invention will become more apparent from more detailed description of exemplary embodiments of the disclosure when read in conjunction with the drawings, wherein like numerals generally refer to like elements in exemplary embodiments of the disclosure.

DETAILED DESCRIPTION OF SPECIFIC EMBODIMENTS OF THE INVENTION

Figure 1:
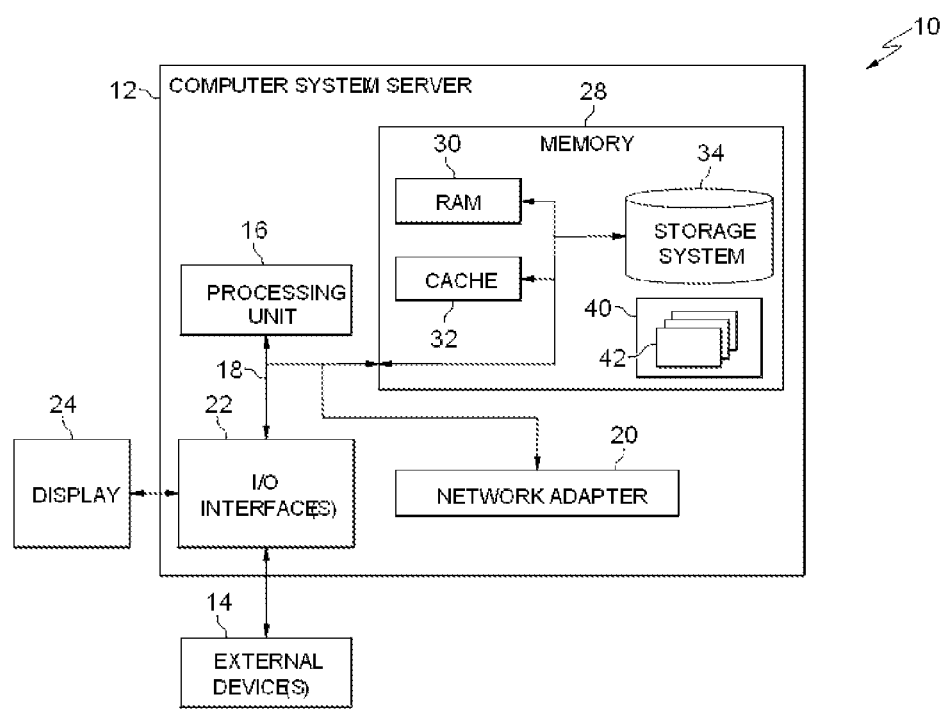
FIG. 1 depicts a block diagram of an exemplary computer system/server 12 suitable for implementing the embodiments of the present invention.

In the following are described preferred embodiments of the present disclosure in more detail by referring to the drawings. Although preferred embodiments of the present invention are illustrated in the drawings, it should be understood that the present disclosure may be implemented in various forms and are not to be limited by the embodiments described herein. Rather, these embodiments are provided to make the present disclosure more thorough and complete, and to convey the scope of the present disclosure fully to those skilled in the art.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

FIG. 1 depicts a block diagram of an exemplary computer system/server 12 suitable for implementing embodiments of the present invention. The computer system/server 12 shown in FIG. 1 is only an example, and should not have any limitation to the functionality and use scope of embodiments of the present invention.

As shown in FIG. 1, the computer system/server 12 is presented in the form of a general computing device. The components of the computer system/server 12 may comprise but are not limited to: one or more processors or processing units 16, a system memory 28, and a bus 18 that connects different system components (including the system memory 28 and processing unit 16).

The bus 18 represents one or more of several types of bus structures, including a memory bus or a memory controller, a peripheral bus, an Accelerated Graphic Port, a processor, or a local bus using any of a variety of bus structures. For example, these architectures include but are not limited to an Industry Standard Architecture (ISA) bus, a Micro Channel Architecture (MAC) bus, an enhanced ISA bus, a Video Electronic Standard Association (VESA) local bus and a Peripheral Component Interconnect (PCI) bus.

The computer system/server 12 typically comprises a plurality of computer system readable mediums. These mediums may be any available mediums accessible by the computer system/server 12, including volatile and non-volatile mediums, removable and non-removable mediums.

The system memory 28 may comprise a computer system readable medium in the form of a volatile memory, e.g., Random Access Memory (RAM) 30 and/or cache memory 32. The computer system/server 12 may further comprise other removable/non-removable, volatile/non-volatile computer system storage mediums. Only for example, the storage system 34 may be used to access non-removable non-volatile magnetic mediums (not shown in FIG. 1, generally referred to as "hard drive"). Although not shown in FIG. 1, a disk drive for reading/writing removable non-volatile disks (e.g. "floppy disks") and a compact disk drive for reading/writing removable non-volatile compact disks (e.g. CD-ROM, DVD-ROM and other optical mediums) may be provided. In these cases, each drive may connect to the bus 18 through one or more data medium interfaces. The memory 28 may comprise at least one program product having a set of (e.g., at least one) program modules, these program modules being configured to perform the functions of various embodiments of the present invention.

A program/utility 40 having a set of (at least one) program modules 42 may be stored in the memory 28, for example, such program modules 42 comprising but not limited to an operating system, one or more applications, other program modules and program data, each or a combination of which examples may comprise an implementation in a network environment. The program modules 42 generally perform the functions and/or methods in the embodiments described of the present invention.

The computer system/server 12 may also communicate with one or more external devices 14 (e.g. a keyboard, a pointing device, a display 24, etc.), and may further communicate with one or more devices that enable interaction between users and the computer system/server 12, and/or communicate with any device (e.g. a network interface card, a modem, etc.) that enables communication between the computer system/server 12 and one or more other computing devices. Such communication may be performed via an input/output (I/O) interface 22. Moreover, the computer system/server 12 may further communicate with one or more networks (e.g. a local area network (LAN), a wide area network (WAN) and/or a public network such as the Internet) via a network adapter 20. As shown in the figure, the network adapter communicates with other modules of the computer system/server 12 via the bus 18. It is to be understood that, although not shown in the figure, other hardware and/or software modules may be used in combination with the computer system/server 12, including but not limited to micro code, a device driver, a redundancy handling unit, an external disk drive array, a RAID system, a tape driver and a data backup storage system, and so on.

Figure 2:
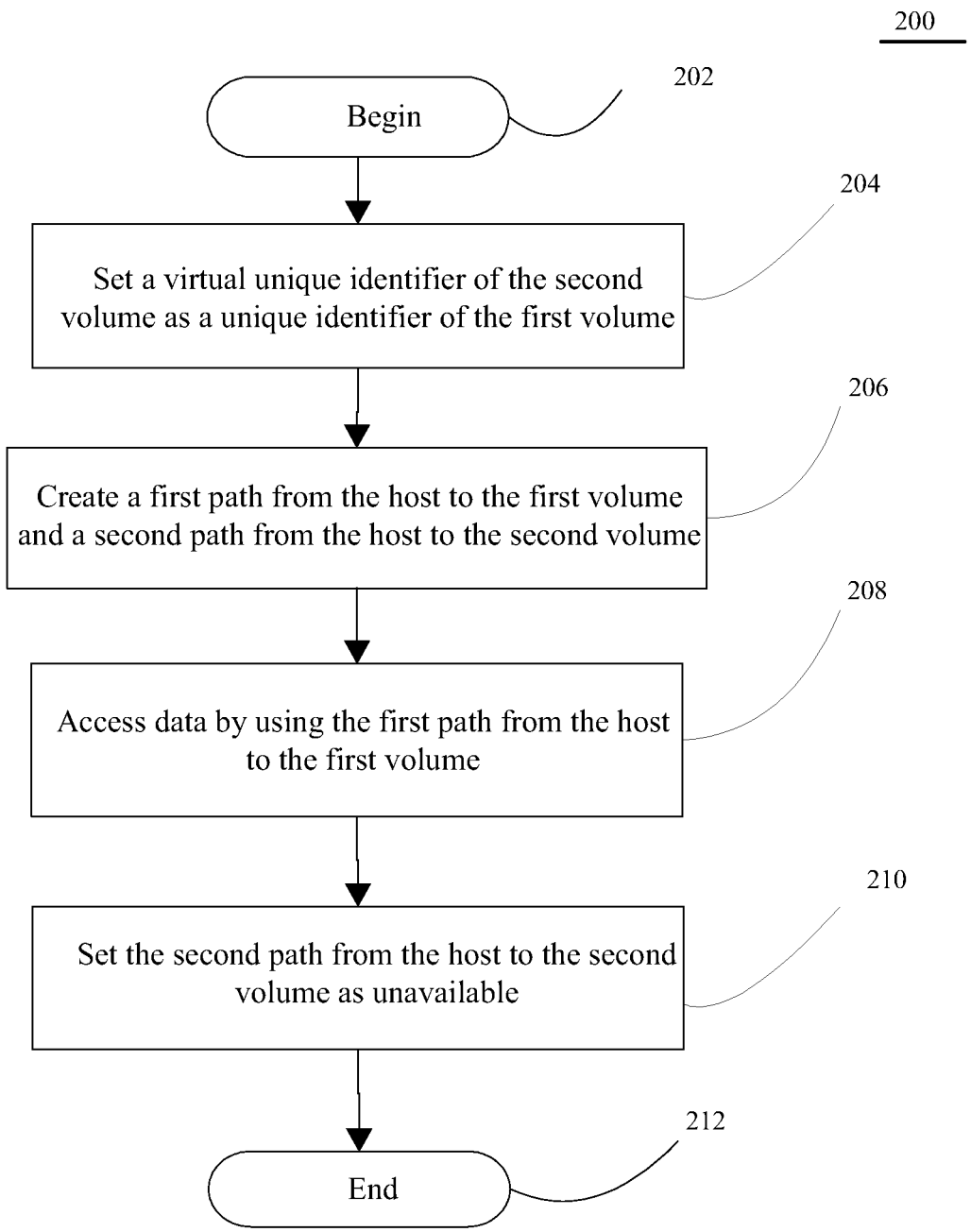
FIG. 2 depicts a flowchart of a method 200 for accessing data in a data storage system according to an embodiment of the present invention.

Now referring to FIG. 2, it illustrates a flowchart of a method 200 for accessing data in a data storage system according to an embodiment of the present invention. According to an embodiment of the present invention, the data storage system comprises at least a first volume and a second volume, and the first volume and the second volume remain consistent by a synchronous copy relationship. Synchronous copying is a technical means commonly used in the art for guaranteeing that the data in volumes as backup to each other in a storage system remain consistent, and it will not be described repeatedly here. Here, a "volume" refers to a device for storing data, which may comprise a disk, a tape and so on. In a data storage system, each volume has a unique identifier (UID) that is used to uniquely identify the volume in the data storage system, i.e. the UID is unique for each volume. Each volume may further have at most one virtual unique identifier (VUID). The virtual unique identifier is an alias assigned to the volume by the data storage system, through which the volume may be accessed. The mapping between the UID and VUID of the volume is maintained by the data storage system for accessing the volume in the data storage system. The UID of each volume is unique, while a plurality of volumes may have the same VUID. When accessing a volume, the host accesses the volume through its I/O port, the volume's I/O port and the volume's VUID. In the following is described a method 200 for accessing data in a data storage system according to an embodiment of the present invention, with reference to the above description.

The method 200 for accessing data in a data storage system according to an embodiment of the present invention begins with step 202. Next, the method 200 proceeds to step 204, in which a virtual unique identifier of the second volume is set to a unique identifier of the first volume. Here, the unique identifier of the first volume is UID_V1, the unique identifier of the second volume is UID_V2. In accordance to an embodiment of the present invention, the virtual unique identifier of the second volume VUID_V2 is set to the unique identifier of the first volume UID_V1, i.e., VUID_V2=UID_V1.

Next, the method 200 proceeds to step 206, in which a first path from the host to the first volume and a second path from the host to the second volume are created by using the unique identifier of the first volume. Here, the first path Path_1 from the host to the first volume is from the host I/O port P_H to the first volume's I/O port P_V1 to the first volume (UID_V1), i.e., Path_1=P_H→P_V1→UID_V1

The second path Path_2 from the host to the second volume is from the host I/O port P_H to the second volume's I/O port P_V2 to the second volume (UID_V1), i.e., Path_2=P_H→P_V2→UID_V1

Here, since the VUID_V2 of the second volume is equal to the unique identifier UID_V1 of the first volume, for the host, there are two paths as described above to reach the volumes (the first volume and the second volume) identified by UID_V1.

Next, the method 200 proceeds to step 208, in which the first path from the host to the first volume is used to access data. Next, the method 200 proceeds to step 210, in which the second path from the host to the second volume is set as unavailable. For the host, there are two paths as described above to reach the volumes (the first volume and the second volume) identified by UID_V1. Therefore, the host needs to be restricted to reach a volume identified by UID_V1 via only one path. Here, the first path Path_1 is used to access data, while the second path Path_2 is set as unavailable.

Next, the method 200 proceeds to step 212 and ends.

So far, the method 200 for accessing data in a data storage system according to an embodiment of the present invention has been described in conjunction with FIG. 2. In this embodiment, since there are a first volume and a second volume that remain consistent by a synchronous copy relationship, continuous data access can be guaranteed.

According to an embodiment of the present invention, in response to a failure of the first volume, the first path from the host to the first volume is set as unavailable, the second path from the host to the second volume is set as available, and data is accessed by using the second path from the host to the second volume. With respect to the data storage system described above, a failure of the first volume will lead to a failure of the first path Path_1. By setting the first path Path_1 as unavailable and setting the second path Path_2 as available, the second path Path_2 may then be used to access data. Since the first volume and the second volume remain consistent by a synchronous copy relationship and there are two paths to reach a volume identified by UID_V1, the host only needs to simply switch the data accessing path from the first path Path_1 to the second path Path_2 to continue data accessing, so that data access is not interrupted.

Furthermore, according to an embodiment of the present invention, in response to a failure of the first volume, the synchronous copying between the first volume and the second volume is suspended. Since the first volume has failed, the synchronous copying between the first volume and the second volume may be affected, so that it needs to be suspended.

Furthermore, according to an embodiment of the present invention, in response to the recovery of the first volume, the synchronous copying between the first volume and the second volume is restored. When the first volume recovers, the synchronous copying between the first volume and the second volume needs to be restored so as to maintain consistency between the first volume and the second volume. At this time, since the data of the second volume is the accurate data, so that the synchronous copy relationship between the first volume and the second volume is directing from the second volume to the first volume.

Furthermore, according to an embodiment of the present invention, in response to the first volume and the second volume being consistent again, the second path from the host to the second volume is set as unavailable, the first path from the host to the first volume is set as available, and data is accessed by using the first path from the host to the first volume. After the first volume recovers and maintains consistent with the second volume by the synchronous copying, the storage system may switch back to the situation where the host accesses data by the first path, i.e., setting Path_2 as unavailable and setting Path_1 as available, and then accessing data by Path_1. Alternatively, there may be no switching, i.e., the host may continue to access data by Path_2 and keep Path_1 as unavailable.

Figure 3:
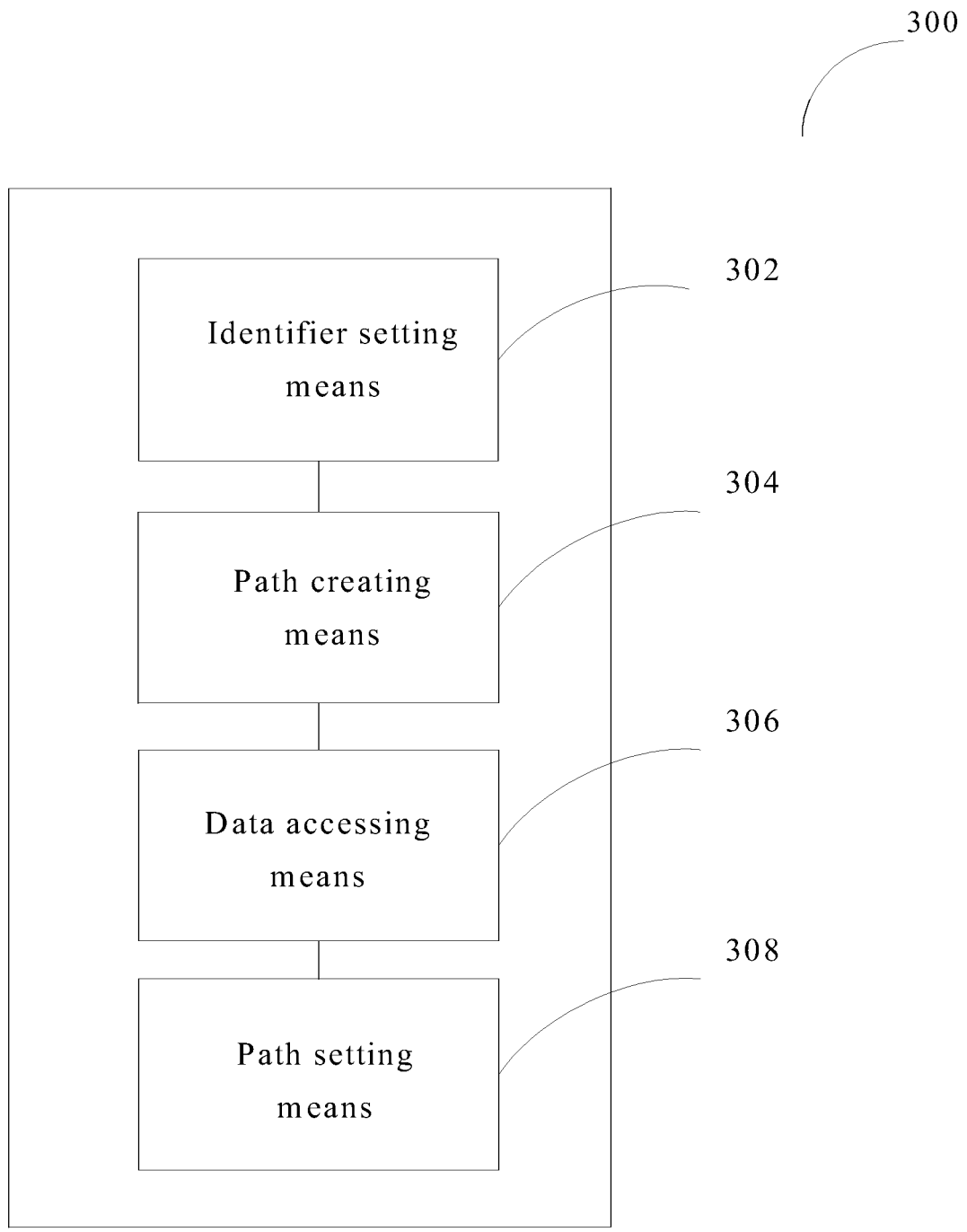
FIG. 3 depicts a block diagram of the apparatus 300 for accessing data in a storage system according to an embodiment of the present invention.

Now referring to FIG. 3, it shows a block diagram of an apparatus 300 for accessing data in a data storage system according to an embodiment of the present invention. According to an embodiment of the present invention, the data storage system comprises at least a first volume and a second volume, and the first volume and the second volume remain consistent by a synchronous copy relationship. The apparatus 300 comprises: identifier setting means 302 configured to set a virtual unique identifier of the second volume as a unique identifier of the first volume; path creating means 304 configured to create a first path from the host to the first volume and a second path from the host to the second volume by using the unique identifier of the first volume; data accessing means 306 configured to access data by using the first path from the host to the first volume; and path setting means 308 configured to set the second path from the host to the second volume as unavailable.

According to an embodiment of the present invention, in response to a failure of the first volume, the path setting means 308 is further configured to: set the first path from the host to the first volume as unavailable; set the second path from the host to the second volume as available; the data accessing means is further configured to: access data by using the second path from the host to the second volume.

According to an embodiment of the present invention, the apparatus 300 further comprises: synchronous copying controlling means (not shown) configured to suspend the synchronous copying between the first volume and the second volume.

According to an embodiment of the present invention, the synchronous copying controlling means is further configured to restore the synchronous copying between the first volume and the second volume in response to the recovery of the first volume.

According to an embodiment of the present invention, in response to the first volume and the second volume being consistent again: the path setting means 308 is further configured to: set the second path from the host to the second volume as unavailable; set the first path from the host to the first volume as available; the data accessing means 306 is further configured to: access data by using the first path from the host to the first volume.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The invention claimed is:

1. A method for accessing data in a data storage system, wherein the data storage system comprises at least a first volume and a second volume, and the first volume and the second volume remain consistent by a synchronous copy relationship, the method comprising:
   setting a virtual unique identifier of the second volume as a unique identifier of the first volume;
   creating a first path from a host to the first volume and a second path from the host to the second volume by using the unique identifier of the first volume;
   accessing data by using the first path from the host to the first volume;
   setting the second path from the host to the second volume as unavailable;
   in response to a failure of the first volume:
   setting the first path from the host to the first volume as unavailable;
   setting the second path from the host to the second volume as available;
   accessing data by using the second path from the host to the second volume; and
   suspending synchronous copying between the first volume and the second volume.

2. The method of claim 1, further comprising:
   in response to a recovery of the first volume, restoring the synchronous copying between the first volume and the second volume.

3. The method of claim 2, further comprising:
   in response to the first volume and the second volume being consistent again:
   setting the second path from the host to the second volume as unavailable;
   setting the first path from the host to the first volume as available; and
   accessing data by using the first path from the host to the first volume.

4. A computer program product comprising a non-transitory computer readable storage medium having stored thereon program code that is operable when executed to perform the method of claim 1.

5. An apparatus for accessing data in a data storage system, wherein the data storage system comprises at least a first volume and a second volume, and the first volume and second volume remain consistent by a synchronous copy relationship, the apparatus comprising a processor coupled to a memory having instructions that are operable, when executed by the processor, to perform a method of:
   setting a virtual unique identifier of the second volume as a unique identifier of the first volume;
   creating a first path from the host to the first volume and a second path from the host to the second volume by using the unique identifier of the first volume;
   accessing data by using the first path from the host to the first volume;
   setting the second path from the host to the second volume as unavailable;
   wherein in response to a failure of the first volume:
   setting the first path from the host to the first volume as unavailable;

setting the second path from the host to the second volume as available;

accessing data by using the second path from the host to the second volume; and suspending synchronous copying between the first volume and the second volume.

6. The apparatus of claim 5, further comprising:

restoring the synchronous copying between the first volume and the second volume in response to recovery of the first volume.

7. The apparatus of claim 6, wherein:

in response to the first volume and the second volume being consistent again:

setting the second path from the host to the second volume as unavailable;

setting the first path from the host to the first volume as available; and accessing data by using the first path from the host to the first volume.

\* \* \* \* \*